US011468488B2

(12) United States Patent
Salani et al.

(10) Patent No.: US 11,468,488 B2
(45) Date of Patent: Oct. 11, 2022

(54) VIRTUAL, LOCATION-BASED CONNECTION TOOL FOR SERVICE PROVIDERS AND USERS

(71) Applicant: UBII LLC, Boca Raton, FL (US)

(72) Inventors: Sergio Salani, Boca Raton, FL (US); Rebecca Noble, Boca Raton, FL (US)

( * ) Notice: Subject to any disclaimer, the term of this patent is extended or adjusted under 35 U.S.C. 154(b) by 399 days.

(21) Appl. No.: 16/501,472

(22) Filed: Jul. 10, 2017

(65) Prior Publication Data

US 2020/0364675 A1   Nov. 19, 2020

Related U.S. Application Data

(60) Provisional application No. 62/359,736, filed on Jul. 8, 2016.

(51) Int. Cl.
  *G06Q 30/06* (2012.01)
  *G06Q 10/10* (2012.01)
  *G06Q 10/06* (2012.01)

(52) U.S. Cl.
  CPC .  *G06Q 30/0627* (2013.01); *G06Q 10/063112* (2013.01); *G06Q 10/1095* (2013.01); *G06Q 30/0641* (2013.01)

(58) Field of Classification Search
  None
  See application file for complete search history.

(56) References Cited

U.S. PATENT DOCUMENTS

| 7,086,008 | B2* | 8/2006 | Capps | G06F 9/44505 |
| | | | | 715/751 |
| 9,582,139 | B1* | 2/2017 | Tseng | H04M 1/72448 |
| 2003/0107606 | A1* | 6/2003 | Capps | G06F 9/44505 |
| | | | | 715/810 |
| 2014/0195927 | A1* | 7/2014 | DeWeese | H04W 12/086 |
| | | | | 715/750 |
| 2014/0235222 | A1* | 8/2014 | Gonen | G06F 3/0484 |
| | | | | 455/418 |
| 2014/0249878 | A1* | 9/2014 | Kaufman | G06Q 10/1095 |
| | | | | 705/7.19 |
| 2016/0042303 | A1* | 2/2016 | Medina | H04W 4/024 |
| | | | | 705/5 |
| 2017/0011324 | A1* | 1/2017 | Truong | G06Q 50/32 |
| 2017/0293950 | A1* | 10/2017 | Rathod | G06Q 30/0639 |

FOREIGN PATENT DOCUMENTS

| WO | WO-2013124850 A1 * | 8/2013 | H04W 4/18 |
| WO | WO-2016113602 A1 * | 7/2016 | G06Q 10/02 |

* cited by examiner

*Primary Examiner* — Mehmet Yesildag
(74) *Attorney, Agent, or Firm* — Oliff PLC

(57) ABSTRACT

A tool is provided with which a user in need of a service may use to select a service provider based on user-set metrics. A request for a service to be performed is received, a set of metrics are extracted from the request, a database of service provider profiles is searched in accordance with the metrics, and a service provider profile that matches the metrics is displayed. Upon selection of the service provider profile, a first message is communicated to a service provider corresponding to the service provider profile. Upon acceptance by the service provider, a second message is communicated to a client device.

12 Claims, 16 Drawing Sheets

502 ─↘

```
○○○BELL 📶    4:25 PM    100%🔋
        SERVICE PROVIDER PROFILE
```

LICENSES/INSURANCE HELD

| UPLOAD DOCUMENT | SUBMIT | ── 550

⊕ ADD MORE DOCUMENTS

SERVICES PROVIDED

| SELECT SERVICES | ── 560

⊕ ADD MORE SERVICES

ADDITIONAL SERVICE

570 {

REQUEST FORM TO ADMIN

SERVICE LOCATION

SEARCH AREA CODES/ADDRESSES
⊕ CLICK HERE ADD MORE LOCATIONS

ADD PICTURES OF WORK
⊕ CLICK HERE ADD EXTRA PICTURES

ADDITIONAL SERVICE

ADD NOTE[S]

580 ── BACKGROUND CHECKS?
⦿ YES  ○ NO

SELECT YOUR SERVICE AREA CIRCLE

590 {

IMAGE

SERVICE CALL HOURLY FEE
1 SERVICES ADDED  [  ]
2 SERVICES ADDED  [  ]

SUBMIT ── 595

FIG. 5B

VIRTUAL, LOCATION-BASED CONNECTION TOOL FOR SERVICE PROVIDERS AND USERS

CROSS REFERENCE TO RELATED APPLICATION(S)

This application is a non-provisional patent application claiming the benefit of the filing date of U.S. Provisional Patent Application Ser. No. 62/359,736 filed on Jul. 8, 2016 and titled "Virtual, Location-Based Connection Tool for Service Providers and Users", which is hereby incorporated by reference.

BACKGROUND

The present embodiments relate to establishing communication between service demand and service providers. More specifically, the embodiments relate to a tool with which a user in need of a service may use to select a service provider based on required and/or preferred metrics.

Factors in deciding upon service providers include time, cost, and quality. Although these factors are common amongst most services, e.g. plumbing services, housekeeping services, electrician services, etc., consideration of the factors is based on research of a broad pool of information. Traditionally, considering the amount of time it will take to complete a task requires one to consider the availability of service providers, the distance service providers are from the site where the task is to be completed, whether the service provider requires an appointment in order to begin on the task, and the amount of time the service provider usually takes to work on the task. Consideration of the cost of hiring a service provider to complete a task may not only take the rate that the service provider charges for working on a task, but also whether the service provider has the licensing and/or certifications necessary to complete the task as per legal or construction code requirements. Likewise, quality of the service providers' work product is predicted by the service providers' years of experience, reputation, ranking and reviews from others.

Due to the advent of the Internet and resource databases, most clients seeking services to be performed conduct research over a variety of platforms. Various platforms offer different types of information about service providers in order to assist in the selection of the service provider. Therefore, in order to make an educated decision in selecting a service provider, one must coordinate research over a multitude of platforms before making a decision and contacting the selected service provider. Unavailability of the selected service provider will prompt a client to have to conduct further research in order to make a secondary selection. Accordingly, the selection of service providers may prove to be cumbersome and research-intensive despite the use of computer technology.

SUMMARY

A computer implemented method, apparatus and system are disclosed for providing a tool with which a user in need of a service may use to select a service provider based on user-set metrics.

The embodiments disclosed provide a tool to consolidate all research for a service provider onto a single platform and establish a communication between the client, which demands service, and an optimal service provider. The tool allows for the client to view available service providers corresponding to a variety of metrics set by the client. The service providers may be viewed not only based on availability, but based on geographical location as well. A selected service provider may be contacted through the tool and communication is established between the client and the service provider.

In one aspect, a system for establishing communication with a service provider is provided with a client-side tool in communication with a first processor and coupled to memory. The client-side tool is to send a request for a service to be performed and the request is to be received by a server-based tool in network communication with the client-side tool, a service-side tool, and a database. The server-side tool is to extract a set of metrics from the request, whereby the metrics include location and service type, search the database for service provider profiles in accordance with the metrics, and provide a service provider profile to the client-side tool, whereby the service provider profile is in accordance with the metrics. Upon a selection of the service provider profile by the client-side tool, the server-side tool is to communicate a first message to a service-side tool which corresponds with the service provider profile. If accepted by the service-side tool, a second message is communicated to the client-side tool.

In another aspect, a computer program product is provided for establishing communication between service demand and service providers. The computer program product has a computer readable storage device with program code embodied therewith. The program code is executable by a processor to receive a request for a service to be performed, extract a set of metrics from the request, whereby the metrics including location and service type, search a database of service provider profiles in accordance with the metrics, and display a service provider profile that matches the metrics. Upon selection of the service provider profile, the program code is to communicate a first message to a service provider corresponding to the service provider profile. Upon acceptance by the service provider, the program code is to communicate a second message to a client device.

In yet another aspect, a method is provided to establish a communication between service demand and service providers. A request for a service to be performed is received, a set of metrics are extracted from the request, the metrics including location and service type, a database of service provider profiles is searched in accordance with the metrics, and a service provider profile that matches the metrics is displayed. Upon selection of the service provider profile, a first message is communicated to a service provider corresponding to the service provider profile. Upon acceptance by the service provider, a second message is communicated to a client device.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments unless otherwise explicitly indicated.

FIG. 5B depicts a view from an electronic device displaying the tool functioning therewith to receive service provider information.

FIG. 16 depicts a procedure to be performed by a system for establishing communication between service demand and a service provider.

DETAILED DESCRIPTION

Figure 1:
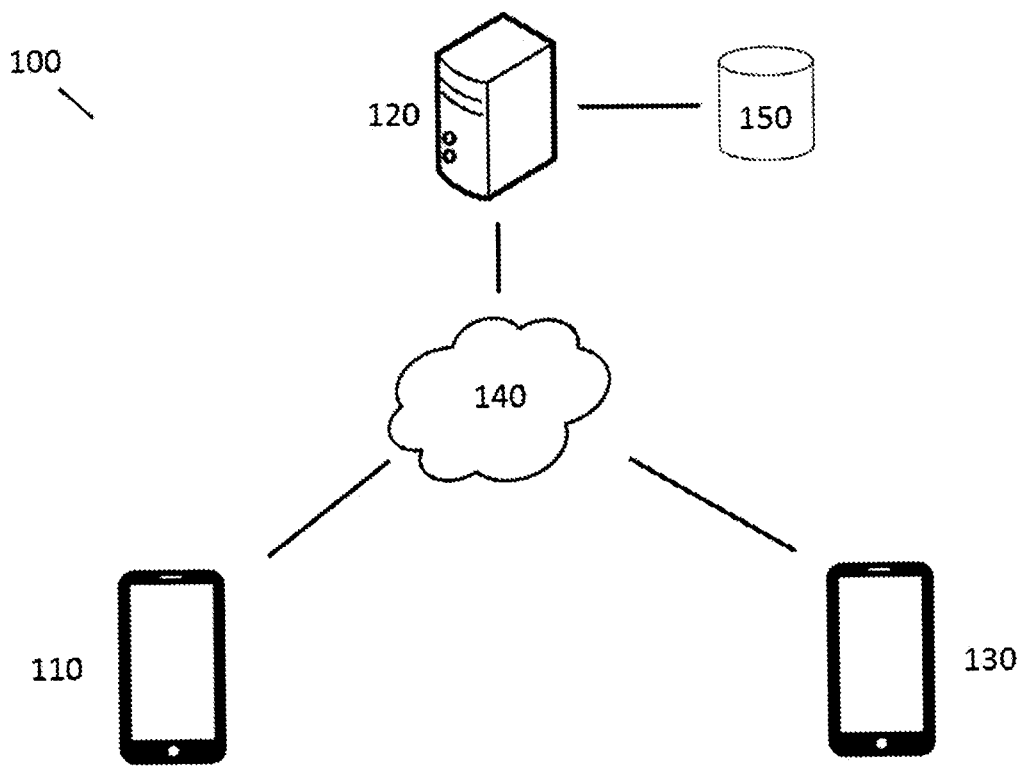
FIG. 1 depicts a block diagram showing components of a system, in accordance with an embodiment, for establishing communication between service demand and a service provider.

It will be readily understood that the components of the present embodiment(s), as generally described and illustrated in the Figures herein, may be arranged and designed in a wide variety of different configurations. Thus, the following detailed description of the embodiments of the apparatus, system, and method of the present embodiment(s), as presented in the Figures, is not intended to limit the scope of the embodiment(s), as claimed, but is merely representative of selected embodiments.

Tools, as referred to herein, may be implemented in programmable hardware devices such as field programmable gate arrays, programmable array logic, programmable logic devices, or the like. Tools may also be implemented in software for execution by various types of processors. An identified tool, as executable code may, for instance, comprise one or more physical or logical blocks of computer instructions which may, for instance, be organized as an object, procedure, function, or other construct. Nevertheless, the executable of an identified tool need not be physically located together, but may comprise disparate instructions stored in different locations which, when joined logically together, comprise the tool and achieve the stated purpose of the tool.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "a select embodiment," "one embodiment," or "an embodiment" means that a particular feature, structure, or characteristic described in connection with the embodiment is included in at least one embodiment described herein. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiment(s) as claimed herein.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

A system for establishing communication with a service provider is provided with a client-side tool in communication with a first processor and coupled to memory. The client-side tool is to send a request for a service to be performed and the request is to be received by a server-based tool in network communication with the client-side tool, a service-side tool, and a database. The server-side tool is to extract a set of metrics from the request, whereby the metrics include location and service type, search the database for service provider profiles in accordance with the metrics, and provide a service provider profile to the client-side tool, whereby the service provider profile is in accordance with the metrics. Displaying a service provider profile may include displaying a map of the location of the service site and the location of the service provider respective to the location of the service site. In one embodiment, the metrics may further include an appointment time set by the client-side tool. In another embodiment, providing the service provider profile includes a display of an availability status of the service provider on the client-side tool. Upon a selection of the service provider profile by the client-side tool, the server-side tool is to communicate a first message to a service-side tool which corresponds with the service provider profile. In another embodiment, the first message includes the extracted metrics from the request. If accepted by the service-side tool, a second message is communicated to the client-side tool. The second message may include a notice of acceptance by the selected service provider and an estimated time of arrival of a service provider associated with the service-side tool. In yet another embodiment, the server-based tool may receive a rating of the service provider from the client device and save the rating to the service provider profile.

FIG. 1 displays a block diagram (100) of an embodiment of the system with a client-side device (110) in network communication with a server (120) and a service-based device (130). Specifically, the client-side device (110) includes a client-side tool in communication with a first processor, which is operatively coupled to a first memory. The client-side device is in network communication with a server (120). The server is in communication with data storage (150). As depicted in FIG. 1, the network communication between the device and the server may be via a cloud network (140). However, the network communication may also be via internet, intranet, etc. Also in network communication to the server (120) and the client-side device (110) is a service-based device (130). The service-based device (130) includes a service-based tool in communication with a second processor, which is coupled to a second memory. Accordingly, the embodiments disclosed provide for an efficient connection between the client-side device (110), whereupon the demand for a service originates, and the service-based device (130), with which the resources to provide the necessary services reside.

In another embodiment, a computer program product is provided for establishing communication between service demand and service providers. The computer program product has a computer readable storage device with program code embodied therewith. The program code is executable by a processor to receive a request for a service to be performed, extract a set of metrics from the request, whereby the metrics including location and service type, search a database of service provider profiles in accordance with the metrics, and display a service provider profile that matches the metrics. Displaying a service provider profile may include displaying a map of the location of the service site and the location of the service provider respective to the location of the service site. In one embodiment, the metrics may further include an appointment time set by the client-side tool. In another embodiment, displaying the service provider profile includes a display of an availability status of the service provider on the client-side tool. Upon selection of the service provider profile, the program code is to communicate a first message to a service provider corresponding to the service provider profile. In another embodiment, the first message includes the extracted metrics from the request. Upon acceptance by the service provider, the program code is to communicate a second message to a client device. The second message may include a notice of acceptance by the selected service provider and an estimated time of arrival of a service provider associated with the service-side tool. In yet another embodiment, a rating of the service provider may be received and saved to the service provider profile.

Figure 2:
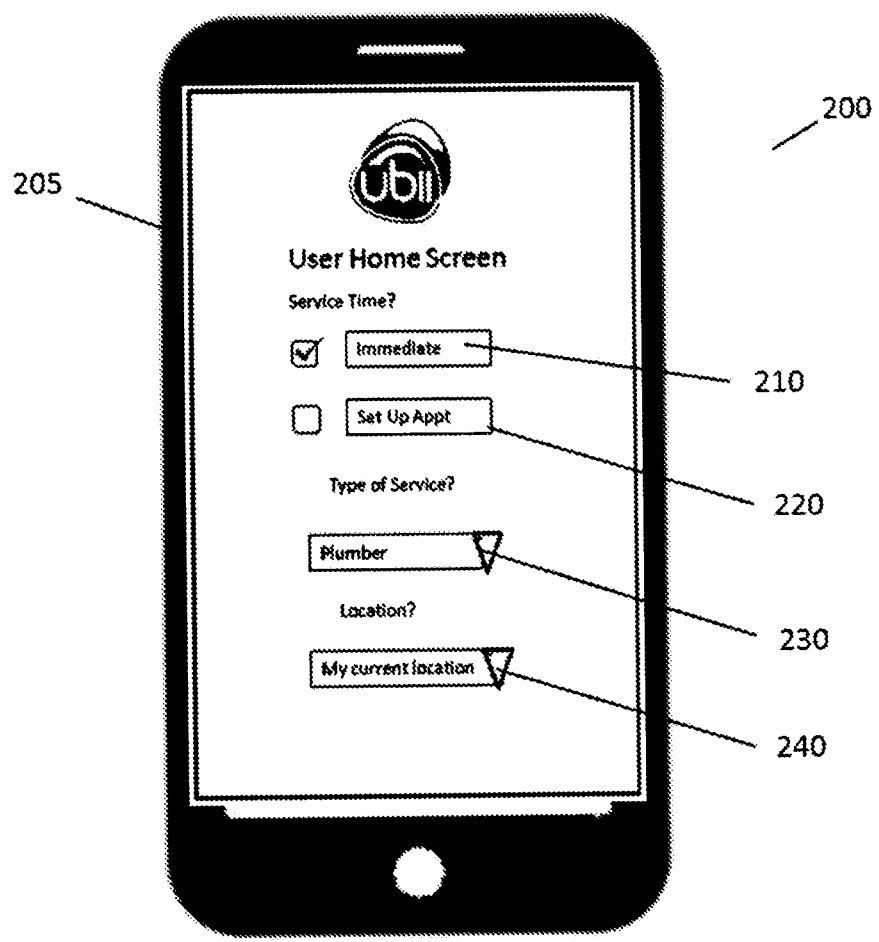
FIG. 2 depicts a device with an embodiment of the tool functioning therewith to request a service.

With regard to FIG. 2, an illustration (200) shows an electronic device (205) with an embodiment of a client-side landing page displayed on the screen. The client side landing page displays input fields (210)-(240) for entering information regarding a service to be performed. Specifically, the first displayed input fields (210) and (220) request whether the service is to be performed immediately, i.e. (210), or at a later planned time, i.e. (220). Input field (230) allows a client to input what category, or type, of service is to be performed. Input field (240) allows a client to input their location or the location of where the service is to be performed. The information collected from input fields (210)—(240) is used to extract metrics for assessing potential service providers for the client. More specifically, the metrics extracted from the input fields filter available service providers in a database of service providers. Accordingly, input fields (210) and (220) provide metrics to filter through service providers in accordance to time-related requirements of the service to be performed. Input field (230) provides metrics to filter through service providers in accordance to service provider qualification-related requirements of the service to be performed. Input field (240) provides metrics to filter through service providers in accordance to current locations of available service providers.

Figure 3:
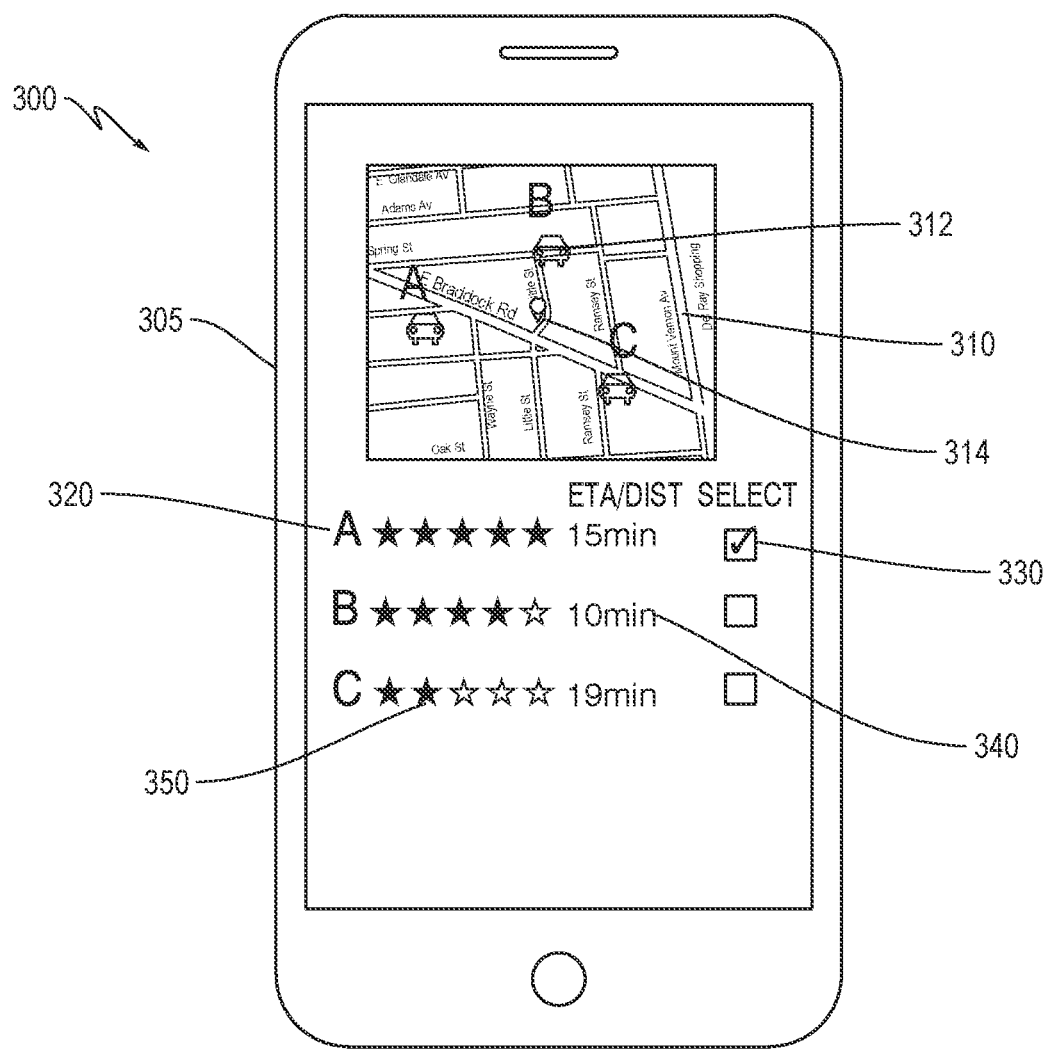
FIG. 3 depicts a device with an embodiment of the tool functioning therewith displaying a map with service providers.

With regard to FIG. 3, an illustration (300) shows an electronic device (305) with an embodiment of the tool functioning therewith displaying a map (310) with service providers. The map (310) displays service providers (312) and their proximity to the location of where the service is to be performed (314). Also displayed in conjunction with the map (310) is a service provider profile summary (320) for each service provider shown on the map (310). Notably, each service provider profile summary (320) shows a rating of the service provider (350), an estimated distance of the service provider from the location of where the service is to be performed (340), and an input field (330) with which a client may select to choose an available service provider.

Figure 4:
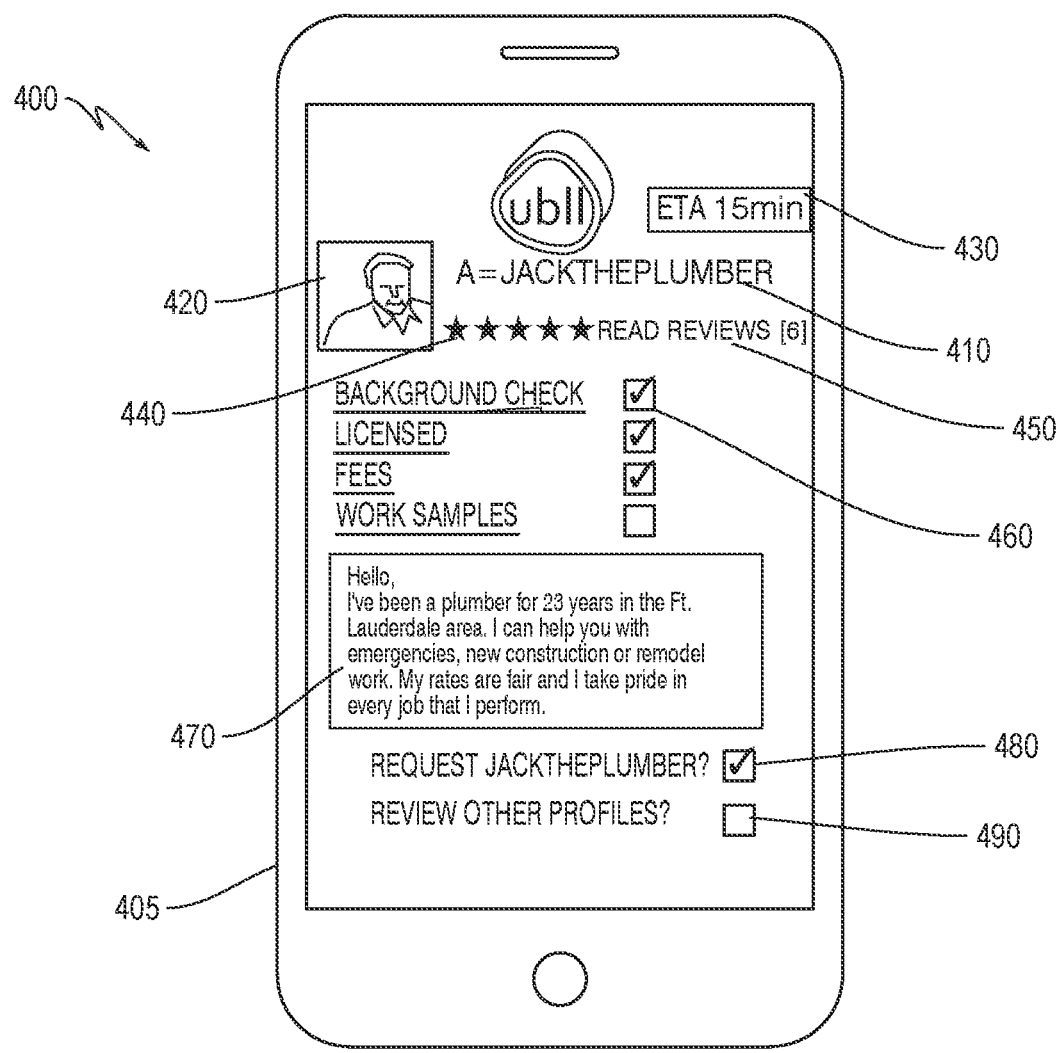
FIG. 4 depicts a device with an embodiment of the tool functioning therewith displaying a service provider profile.

FIG. 4 depicts a device (405) with an embodiment of the tool functioning therewith displaying a service provider profile. The service provider profile features information relating to the service provider and the work performed by the service provider. In the embodiment shown in FIG. 4, the profile includes the name (410) of the service provider, picture (420) of the service provider, rating (440) of the service provider, reviews (450) of the service provider by other previous clients, and additional information (460) regarding the service provider. As shown in the illustration (400), the additional information (460) may include whether the service provider has completed a background check, is licensed for the particular type of service requested, has posted fees correlating to the service provider's services, and samples of previous jobs completed by the service provider. A service provider may also provide a short summary (470) of themselves with information that exceeds the framework provided by the tool. If the profile is viewed in conjunction with a map or location specific service, an estimated time of arrival (430) to the service site may be provided so that one may estimate the expected time for completion of the service. Also displayed is an option to select the service provider corresponding to the service provider profile (480), or to view other service provider profiles (490).

Figure 5A:
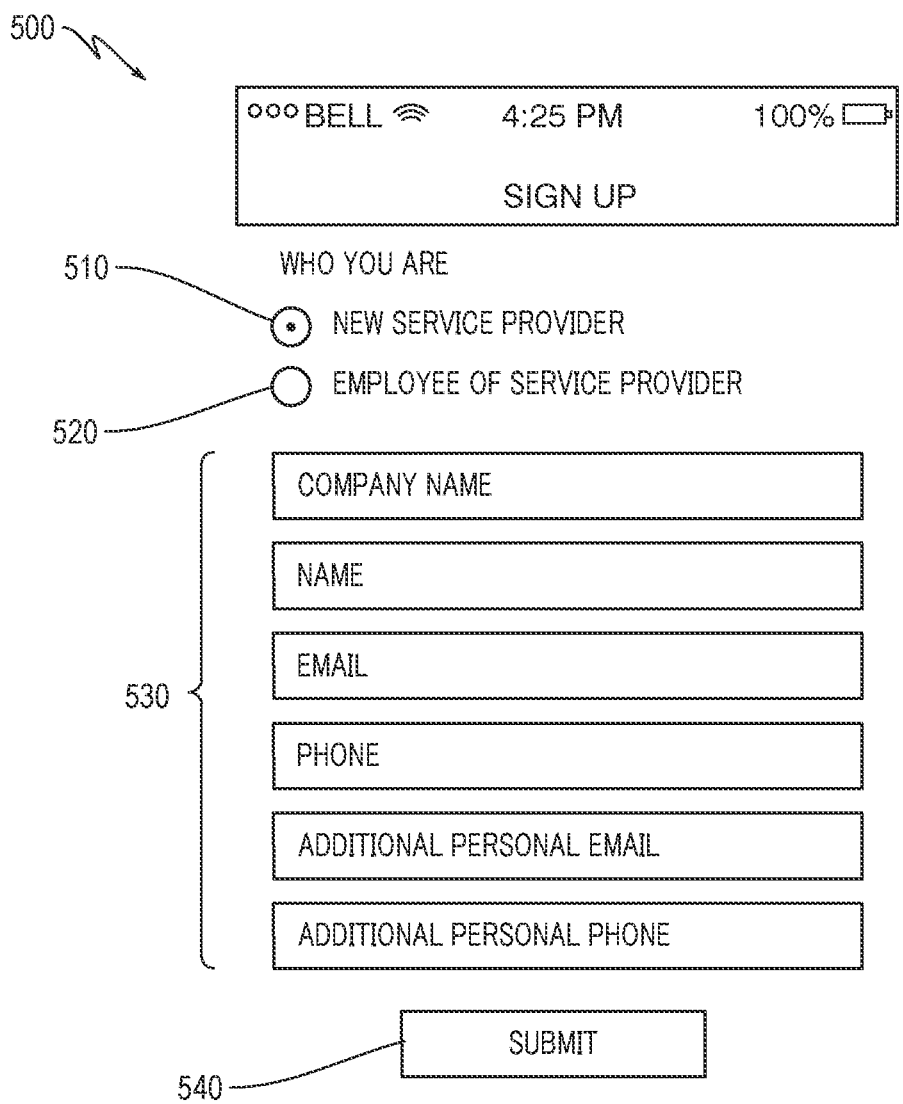
FIG. 5A depicts a view from an electronic device displaying the tool functioning therewith to receive service provider information.

FIG. 5A depicts a view (500) from an electronic device displaying the tool functioning therewith to receive service provider information. Specifically, a service provider is inquired to provide information regarding whether the service provider is creating a profile as a sole service provider (510) or employee of a service provider (520). Details of the service provider's correspondence information are compiled from input fields (530). Information may subsequently be submitted using a button (540).

FIG. 5B depicts a view (502) from an electronic device displaying the tool functioning therewith to receive additional service provider information. Specifically, a service provider is inquired to provide proof of license and/or insurance (510), the service(s) capable of being provided (560), Location data of where the service provider conducts business is entered in input fields (570). The service provider may allow for background checks to be conducted (580). Additionally, a service provider may set metrics, via input fields (590), regarding the radius of where the service provider is willing to travel to perform the services and what hourly rates are requested from clients. Information may subsequently be submitted using a button (595).

Figure 6:
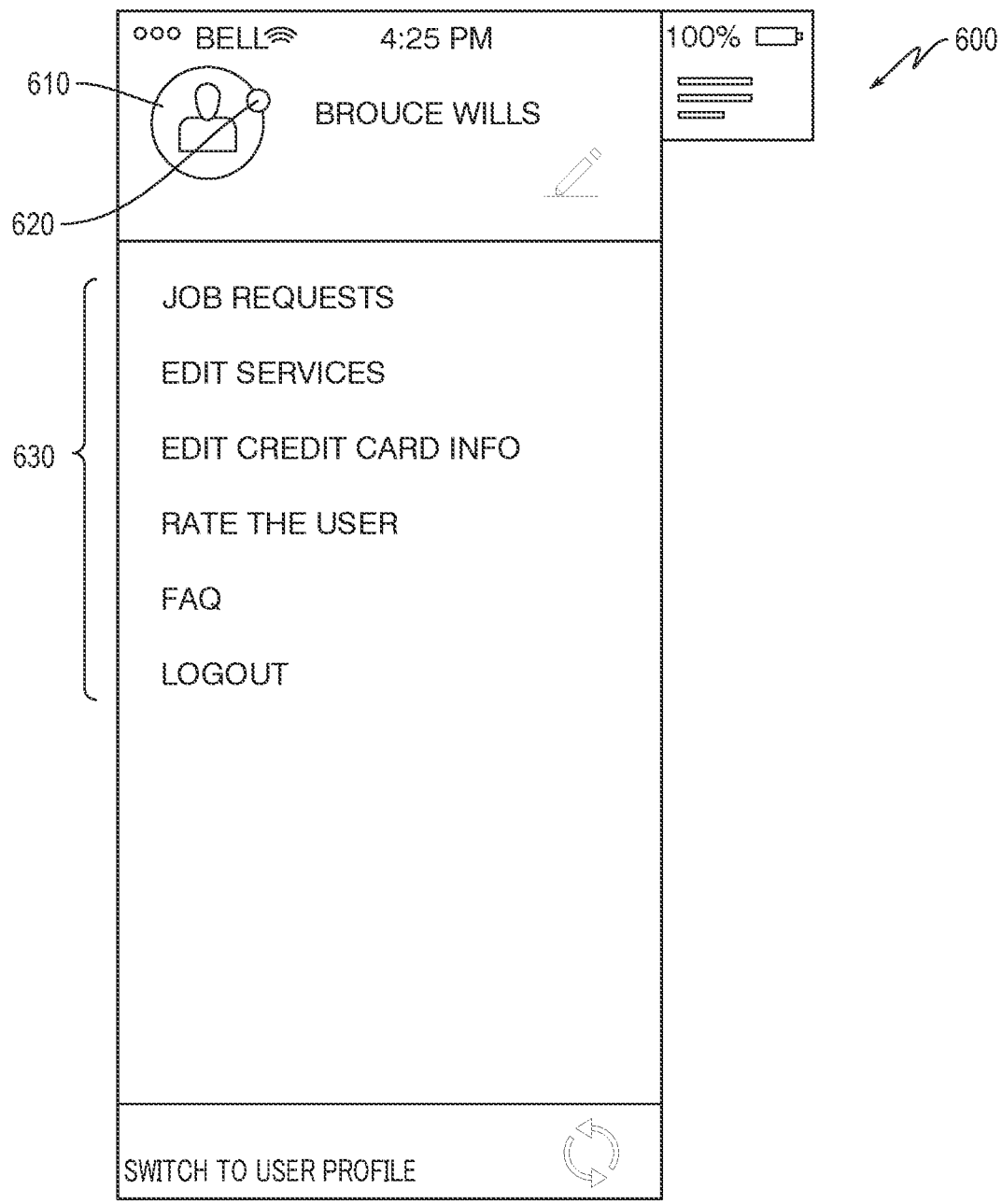
FIG. 6 depicts a view from an electronic device displaying the tool functioning therewith to display a service provider home screen.

FIG. 6 depicts a view (600) from an electronic device displaying the tool functioning therewith to display a service provider home screen. Displayed is a service provider picture (610), availability status (620), and a list of options (630) from which the service provider may navigate the tool. In the embodiment shown in FIG. 6, within the list of options (630), a service provider may view pending service requests, i.e. also referred to as job requests. The service provider is also able to edit profile information and rate a client.

Figure 7:
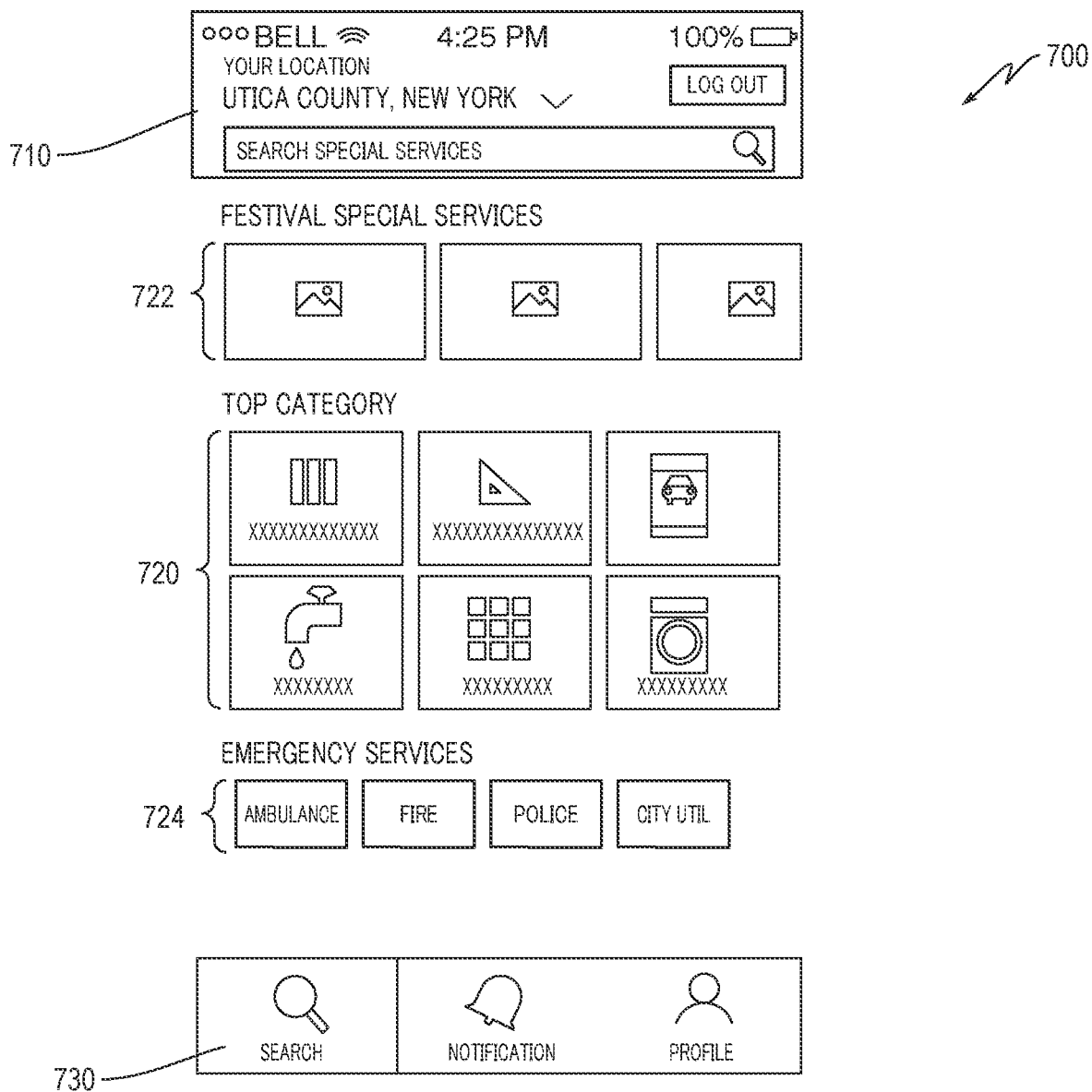
FIG. 7 depicts a view from an electronic device displaying the tool functioning therewith to display a service selection screen.

FIG. 7 depicts a view (700) from an electronic device displaying the tool functioning therewith to display a service selection screen. The service selection screen is viewed from a client-side device and allows a client to select a variety of services to be performed. The client's location (710) is noted and can be changed by the client depending on the nature of the service to be performed. Services may also be categorized on the display so as to facilitate navigation of the tool. As shown on the depicted embodiment of FIG. 7, services are categorized into event-specific services (722), most commonly used services (720), and emergency services (724). The client is also able to use a search feature (730) in order to search for services not immediately depicted on the screen.

Figure 8:
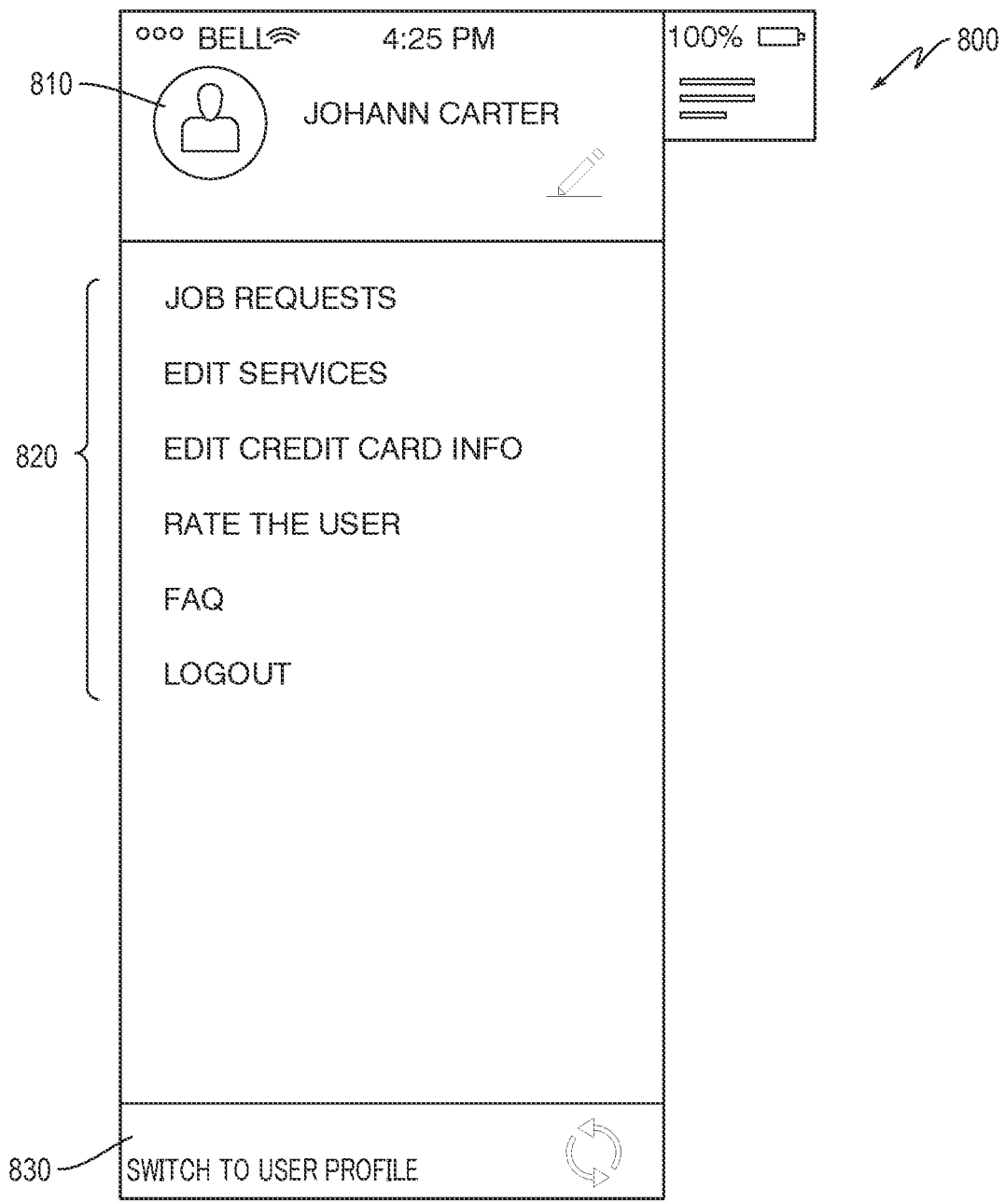
FIG. 8 depicts a view from an electronic device displaying the tool functioning therewith to display a client-side home screen.

FIG. 8 depicts a view (800) from an electronic device displaying the tool functioning therewith to display a client-side home screen. Displayed on the client-side home screen is a profile name and picture (810) as well as a list (820) to navigate the tool from the client-side perspective. Using the list (820), a client may request a new service to be performed, track a service provider en route, see previous service requests, manage service requests that are pending, chat with a help center representative, etc. Selection of option (830) allows for a client with both a client profile and a service provider profile to toggle from the client profile to the service provider profile. Accordingly, a user of the tool may switch between requesting services as a client or providing services as a service provider.

Figures 9A, 9B:
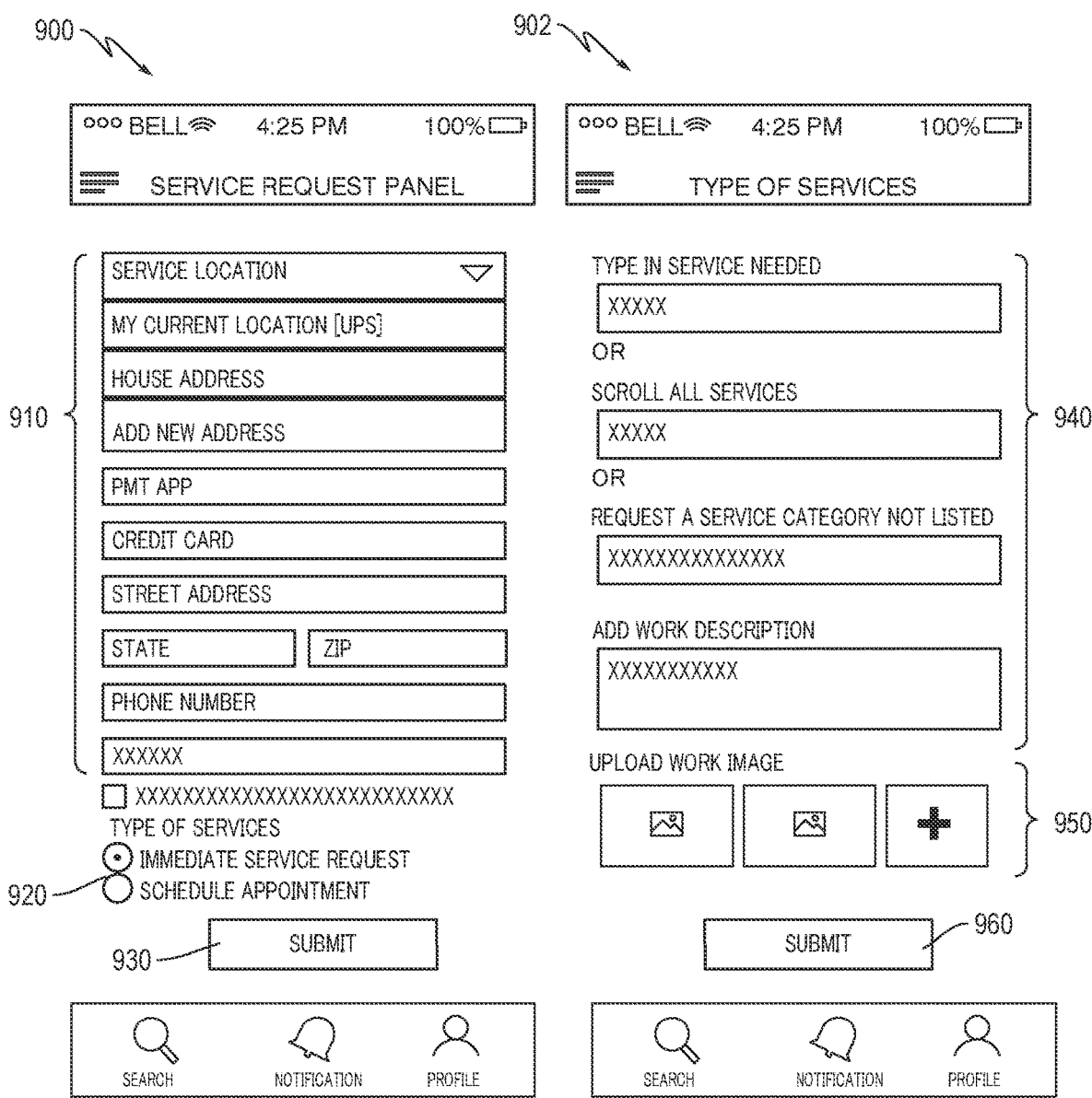
FIG. 9A depicts a view from an electronic device displaying the tool functioning therewith to request a service.
FIG. 9B depicts a view from an electronic device displaying the tool functioning therewith to request a service.

FIG. 9A depicts a view (900) from an electronic device displaying the tool functioning therewith for a client to request a service. Input fields (910) request location and correspondence information from the client. Time-related requirements of the services to be performed are selected in input fields (920). The time-related information collected in input fields (920) may include whether the service is to be performed immediately or at a later time via appointment. Information may subsequently be submitted using a button (930).

FIG. 9B depicts a view (902) from an electronic device displaying the tool functioning therewith to request a service. Additional information may be entered into input fields (940) to further describe the nature of the services requested as well as images of the site where the services are to be rendered (950). Information gathered from the client in these input fields may be used by service providers to evaluate whether to accept a service request or reject such request. Information may subsequently be submitted using a button (960).

Figure 10:
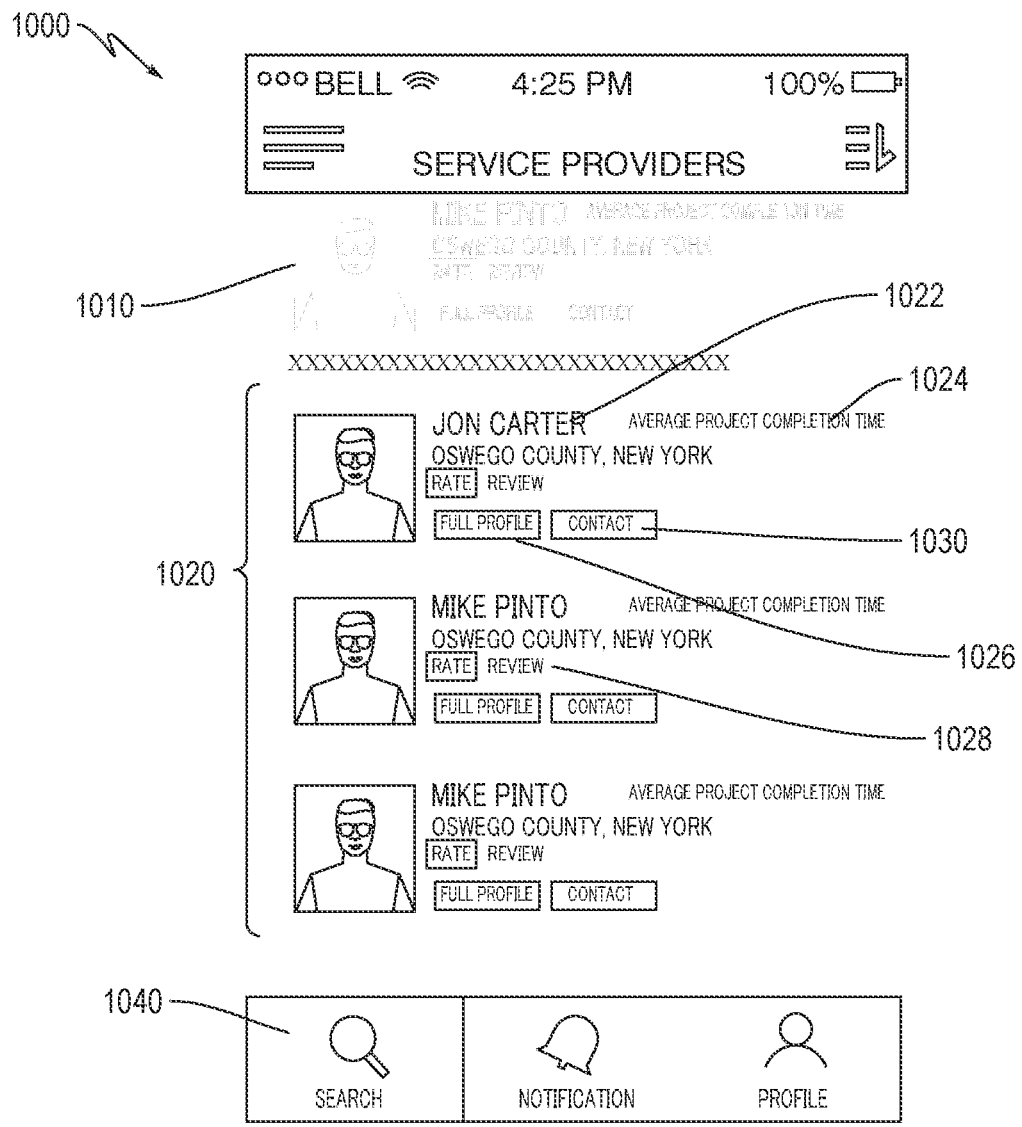
FIG. 10 depicts a view from an electronic device displaying the tool functioning therewith to display service providers and corresponding service provider availability.

FIG. 10 depicts a view (1000) from an electronic device displaying the tool functioning therewith to display service providers and corresponding service provider availability. Unavailable service providers (1010) may be darkened or faded as to indicate unavailability. Available service providers (1020) are displayed and corresponding service provider profiles are available for review. A short summary of each service provider profile indicates the service provider's name and location (1022), rating and reviews (1028), and average time to complete the service (1024). Selecting a first button (1026) allows the client to view the full profile of the service provider. Selecting a second button (1030) allows for the client to select the service provider and send a first communication to the service provider. A search function (1040) allows the client to search for other profiles outside of the provided list of available service providers (1020).

Figure 11:
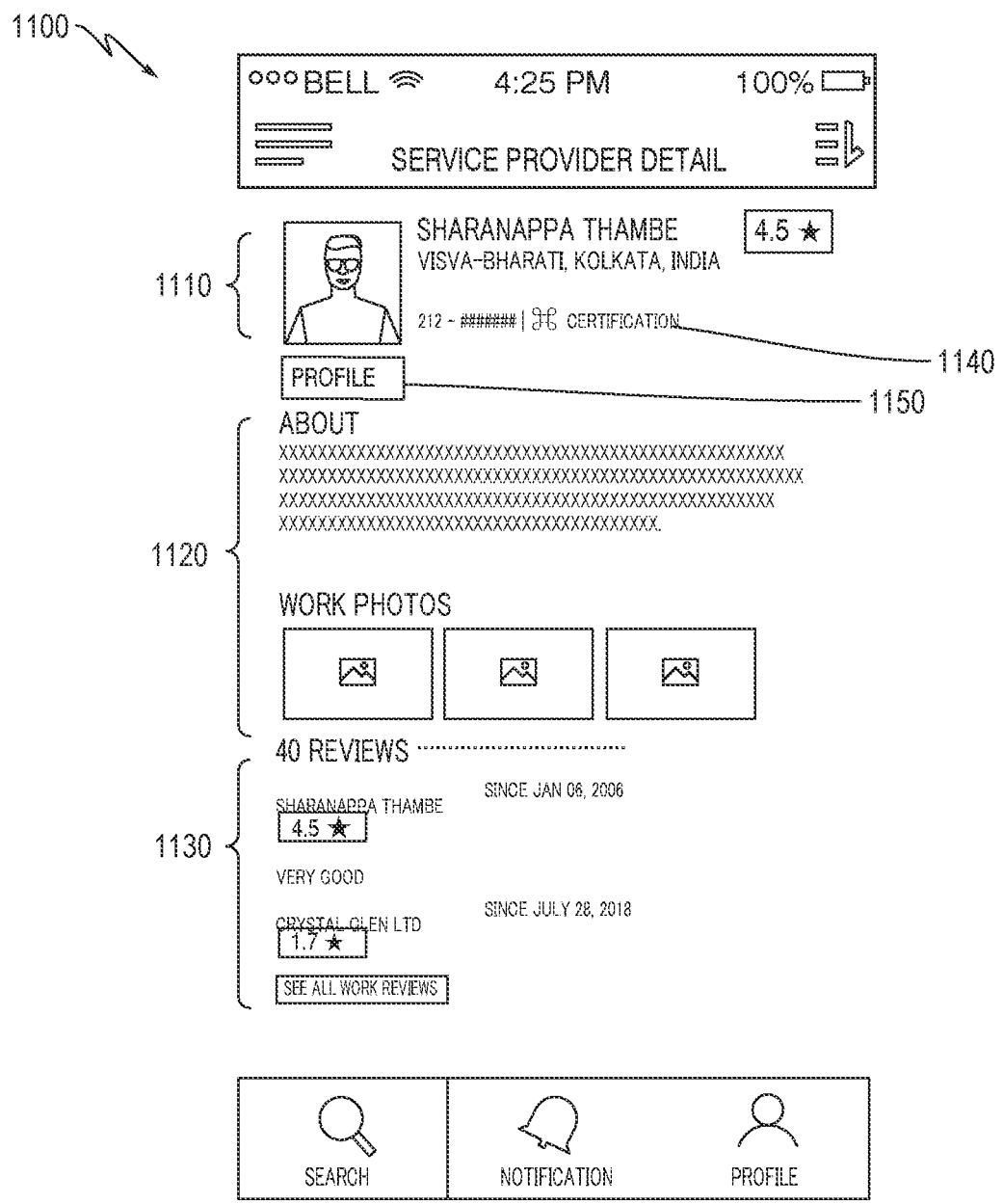
FIG. 11 depicts a device with an embodiment of the tool functioning therewith to display a service provider profile.

FIG. 11 depicts a view (1100) from an electronic device displaying the tool functioning therewith to display a service provider profile. Selecting the button (1026), as shown in FIG. 10, allows a client to view the full profile of the corresponding service provider. Specifically, profile information is displayed including service provider name, picture, location, and number of times hired for a service through the tool, collectively (1110). Verification information (1140) may also be included with the profile. Other sections, such as a short summary provided by the service provider and work photos from previous jobs, collectively (1120), may be included in the profile. Reviews and rating information may also be consolidated in a separate section (1130). Additionally, a client may be able to select the viewed service provider directly from the profile screen by pressing a button (1150).

Figure 12:
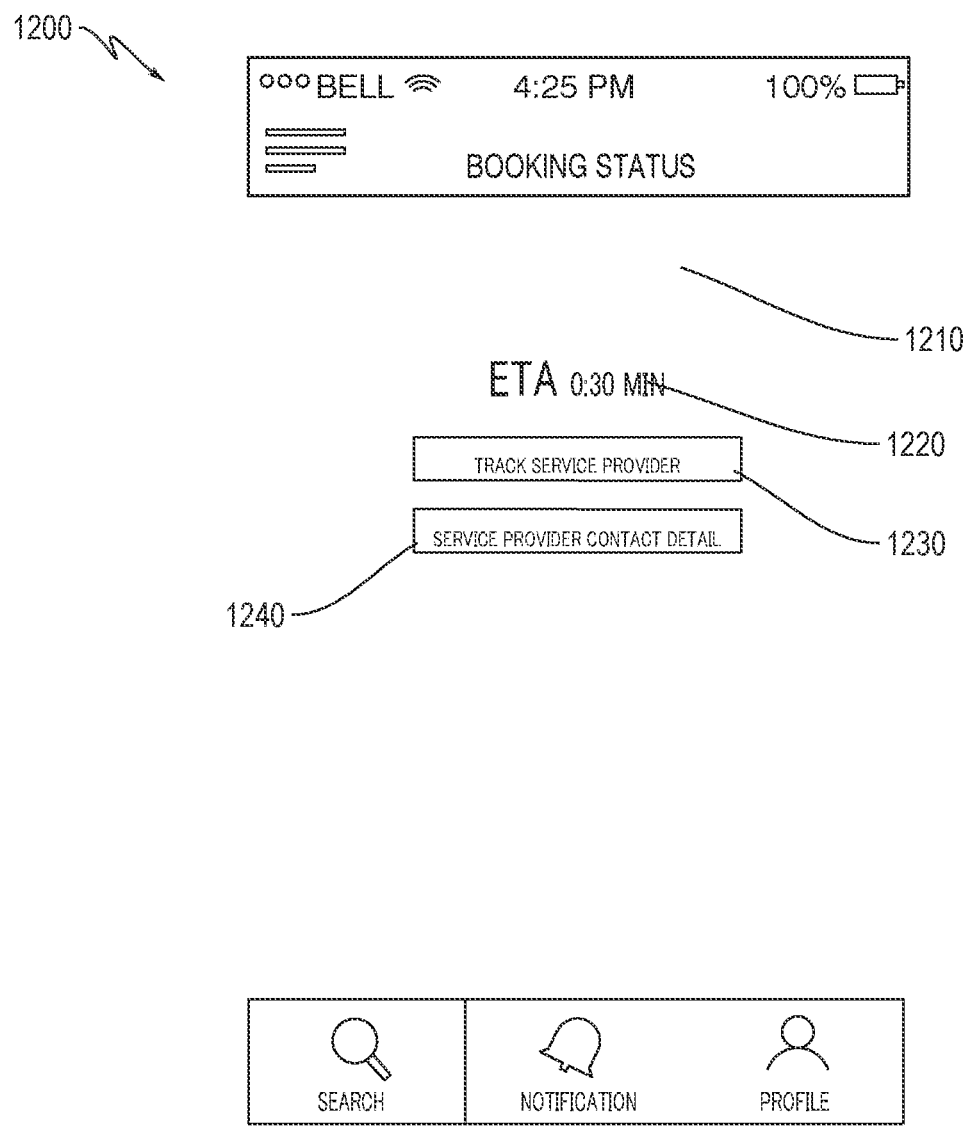
FIG. 12 depicts a view from an electronic device displaying the tool functioning therewith displaying a service provider profile.

FIG. 12 depicts a view (1200) from an electronic device displaying the tool functioning therewith displaying a second message. Upon selection of a service provider and acceptance of the service request by the service provider, a message (1210) is received by the client. Included in the message (1210) is an estimated time of arrival by the service provider (1220). Also included in the message is an option to view the service provider en route on a map (1230). Selection of another button (1240) allows the client to view the service provider contact information in the case that the client wishes to contact the service provider outside the tool.

Figure 13:
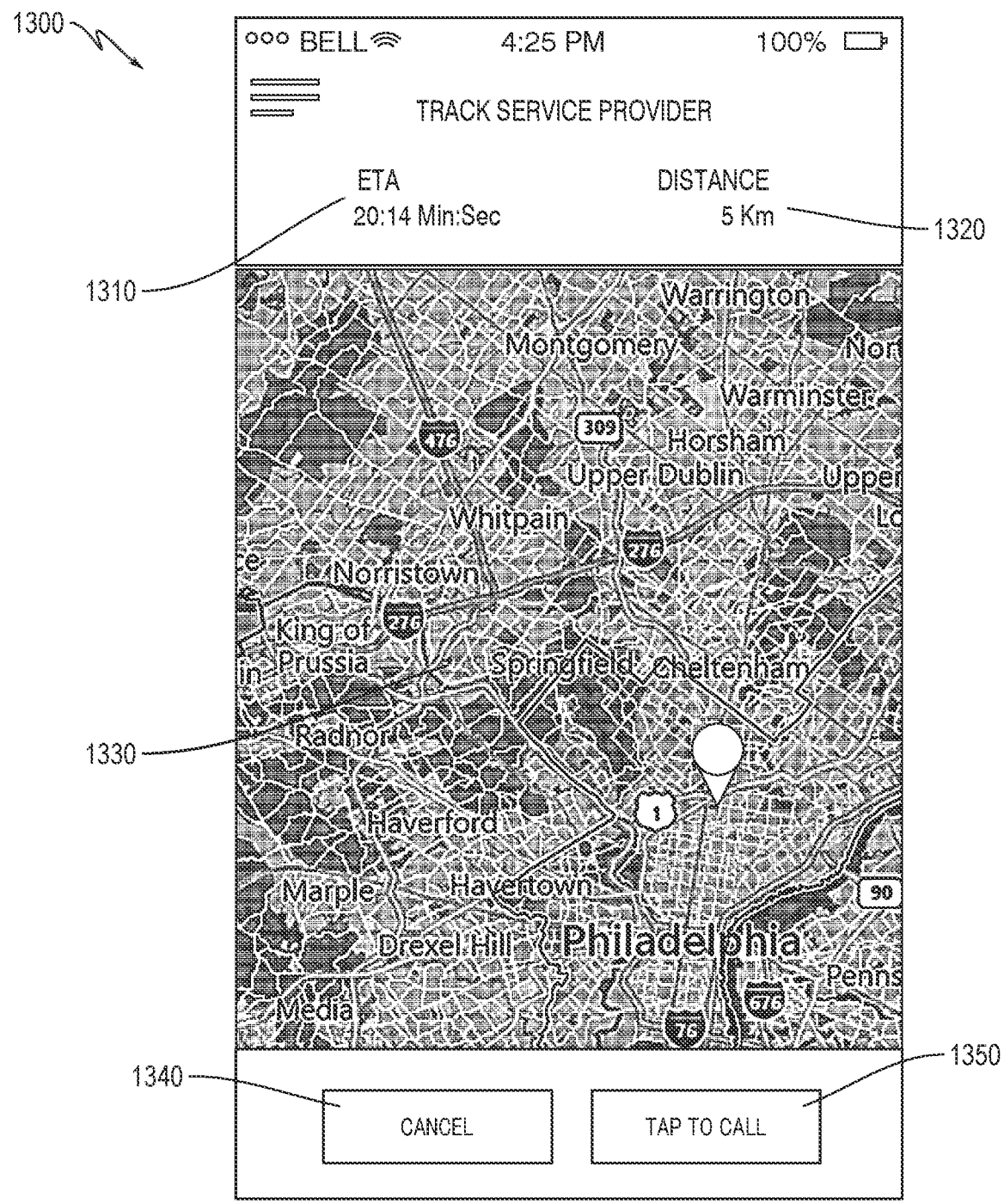
FIG. 13 depicts a view from an electronic device displaying the tool functioning therewith.

FIG. 13 depicts a view (1300) from an electronic device displaying the tool functioning therewith. Upon pressing the button (1230), as shown in FIG. 12, a map (1330) is displayed of the client's vicinity. An estimated time of arrival (1310) of the service provider to the service location is provided as well as a distance calculation (1320) between the service provider and the service location. A cancel button (1340) returns the client to the second message screen displayed in FIG. 12. A contact button (1350) allows for the client to contact the service provider within the tool.

Figure 14:
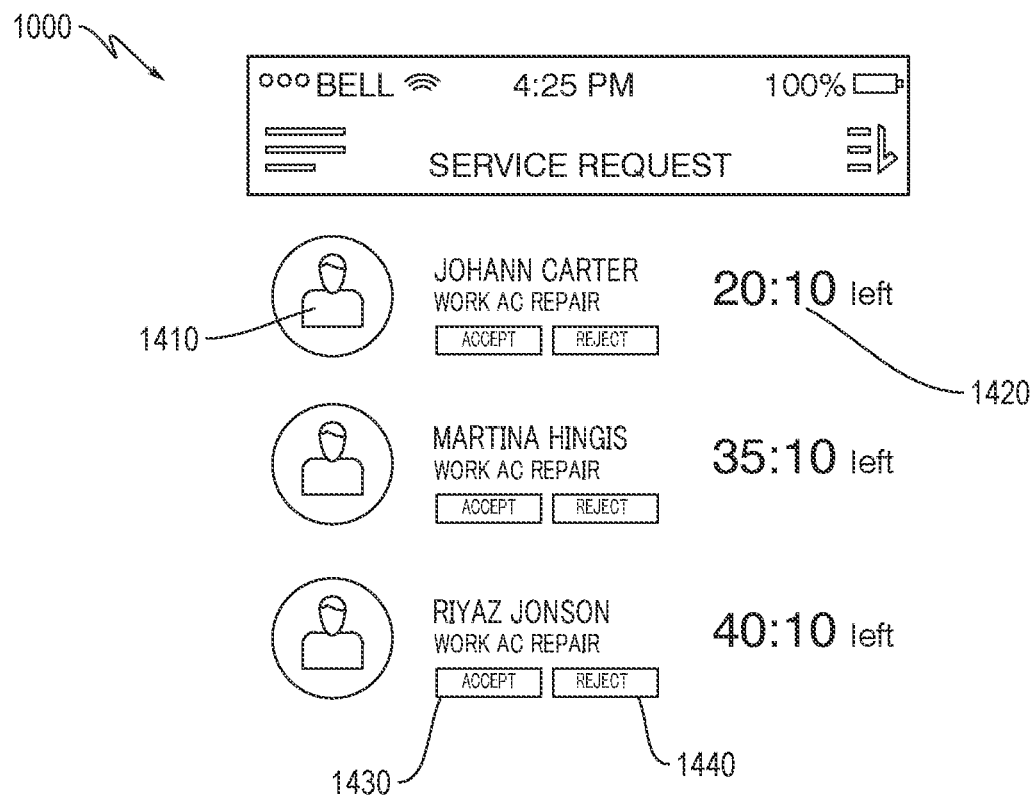
FIG. 14 depicts a view from an electronic device displaying the tool functioning therewith.

FIG. 14 depicts a service-side view (1400) from an electronic device displaying the tool functioning therewith. In the depicted service side view, a service provider may manage received service requests and select which service requests the service provider wishes to fulfill. The list of service requests includes the client profiles (1410) of each client that submitted the service request as well as the time left to accept and complete the requested service (1420). With buttons (1430) and (1440) the service provider may accept or reject a service request, respectively.

Figure 15:
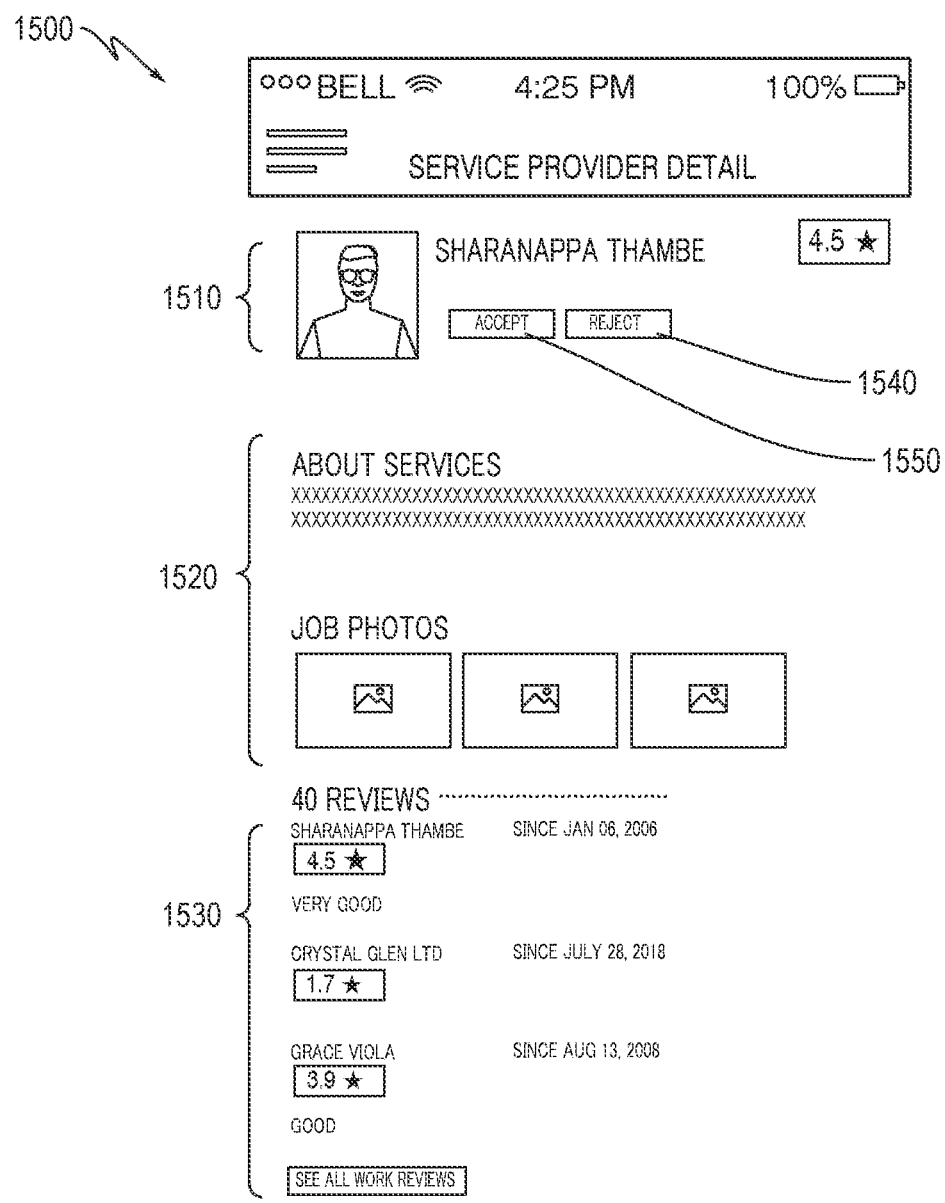
FIG. 15 depicts a view from an electronic device displaying the tool functioning therewith.

FIG. 15 depicts a service-side view (1500) from an electronic device displaying the tool functioning therewith. As shown, a service provider may view profile details (1510) of the client requesting the service. Profile details may include a picture, name, and rating of the client. Reviews and ratings of the client by other service providers may also be viewed in section (1530). Details (1520) of the service request or the job request are also provided by the client. The details (1520) may be in the form of a summary or photos of the job site provided by the client. Again, with buttons (1550) and (1540) the service provider may accept or reject a service request, respectively.

With respect to FIG. 16, a method (1600) is provided to establish a communication between service demand and service providers. The method (1600) includes receiving a request for a service to be performed (1610), extracting a set of metrics from the request (1620), the metrics including location and service type, searching a database of service provider profiles in accordance with the metrics (1630), and displaying a service provider profile that matches the metrics (1640). Displaying a service provider profile may include displaying a map of the location of the service site and the location of the service provider respective to the location of the service site. In one embodiment, the metrics may further include an appointment time set by the client-side tool. Upon selection of the service provider profile (1650), a first message is communicated to a service provider corresponding to the service provider profile (1660). In another embodiment, the first message includes the extracted metrics from the request. In another embodiment, displaying the service provider profile includes a display of an availability status of the service provider on the client-side tool. Upon acceptance by the service provider (1670), a second message is communicated to a client device (1680). The second message may include a notice of acceptance by the selected service provider and an estimated time of arrival of a service provider associated with the service-side tool. In yet another embodiment, a rating of the service provider may be received and saved to the service provider profile.

Furthermore, the described features, structures, or characteristics may be combined in any suitable manner in one or more embodiments. In the following description, numerous specific details are provided, such as examples of agents, to provide a thorough understanding of the embodiment(s). One skilled in the relevant art will recognize, however, that the embodiment(s) can be practiced without one or more of the specific details, or with other methods, components, materials, etc. In other instances, well-known structures, materials, or operations are not shown or described in detail to avoid obscuring aspects.

The present embodiment(s) may be a system, a method, and/or a computer program product. The computer program product may include a computer readable storage medium (or media) having computer readable program instructions thereon for causing a processor to carry out aspects of the present embodiment(s).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Accordingly, a computer readable storage medium, as used herein, is non-transitory.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to the various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiment(s) has been presented for purposes of illustration and description, but is not intended to be exhaustive or limited to the embodiment(s) in the form disclosed. Many modifications and variations will be apparent to those of ordinary skill in the art without departing from the scope and spirit of the embodiment(s). The embodiment was chosen and described in order to best explain the principles and the practical application, and to enable others of ordinary skill in the art to understand the embodiment(s) for various embodiments with various modifications as are suited to the particular use contemplated. Accordingly, the tool with which a user in need of a service may use to select a service provider based on required and/or preferred metrics expedites and personalizes the service performance of the service provider.

It will be appreciated that, although specific embodiments have been described herein for purposes of illustration, various modifications may be made without departing from the spirit and scope of the invention. In particular, different metrics, hardware components, and virtual components may be used. Similarly, various types of services may be provided including delivery of goods. Additionally, the purchase of goods and/or materials that accompany the services disclosed herein is also possible via the tool. Accordingly, the scope of protection of this invention is limited only by the following claims and their equivalents.

What is claimed is:

1. A system comprising:
a client-side tool that is in communication with a first processor and operatively coupled to a first memory, the client-side tool being configured to send a request for a service to be performed; and
a server-based tool that is in network communication with the client-side tool, a service-side tool, and a database, the server-based tool being configured to:
receive the request from the client-side tool;
extract a set of metrics from the request, the metrics including a location of a service site and a service type;
search the database for service provider profiles in accordance with the metrics;
cause a service provider profile that is in accordance with the metrics to be displayed on the client-side tool,
wherein the display of the service provider profile on the client-side tool includes concurrently displaying on a same screen all of (i) a map of the location of the service site and a location of the service provider relative to the location of the service site, (ii) a rating of the service provider, (iii) an estimated distance of the service provider from the location of the service site, and (iv) an input field for selecting the service provider;
upon selection of the service provider profile by the client-side tool, communicate a first message to the service-side tool, the service-side tool corresponding with the selected service provider profile; and
upon receipt of an acceptance by the service-side tool, communicate a second message to the client-side tool, the second message including a notice of acceptance by the service-side tool corresponding with the selected service provider profile, and an estimated time of arrival of a selected service provider associated with the service-side tool,
wherein, when a user has both a client profile and a service provider profile, a home screen of the client-side tool displays the user's client profile and an option to directly toggle from the client-side tool to the service-side tool,
upon selection of the option on the home screen of the client-side tool, the home screen of the client-side tool is automatically replaced with a screen of the service-side tool that displays the user's service provider profile and an option to view a pending job request, and the view of the pending job request is a list of pending service requests, each with a client profile that submitted a respective service request and a time left to accept and complete the respective service request, and the server-based tool is further configured to receive a rating of a service provider from the client-side tool and save the rating to a corresponding service provider profile.

2. The system of claim 1, wherein the metrics further include appointment time.

3. The system of claim 2, wherein the first message includes the extracted metrics.

4. The system of claim 1, wherein the service provider profile is provided to the client-side tool for display which includes a display of an availability status of the service provider on the client-side tool.

5. A computer program product for establishing communication between service demand and service providers, the computer program product comprising a non-transitory computer readable storage device having program code embodied therewith, the program code executable by a processor to:

receive a request fora service to be performed;
extract a set of metrics from the request, the metrics including a location of a service site and a service type;
search a database of service provider profiles in accordance with the metrics;
display a service provider profile that matches the metrics on a client-side tool,
wherein the display of the service provider profile on the client-side tool includes concurrently displaying on a same screen all of (i) a map of the location of the service site and a location of the service provider relative to the location of the service site, (ii) a rating of the service provider, (iii) an estimated distance of the service provider from the location of the service site, and (iv) an input field for selecting the service provider;
upon selection of the service provider profile, communicate a first message to a service-side tool having the selected service provider profile; and
upon acceptance by the service-side tool, communicate a second message to the client-side tool, the second message including a notice of acceptance by the service-side tool corresponding with the selected service provider profile, and an estimated time of arrival of a selected service provider associated with the service-side tool,
wherein, when a user has both a client profile and a service provider profile, a home screen of the client-side tool displays the user's client profile and an option to directly toggle from the client-side tool to the service-side tool,
upon selection of the option on the home screen of the client-side tool, the home screen of the client-side tool is automatically replaced with a screen of the service-side tool that displays the user's service provider profile and an option to view a pending job request, and the view of the pending job request is a list of pending service requests, each with a client profile that submitted a respective service request and a time left to accept and complete the respective service request, and the computer program product further comprises program code executable by the processor to receive a rating of a service provider from the client-side tool and save the rating to a corresponding service provider profile.

6. The computer program product of claim 5, wherein the metrics further include appointment time.

7. The computer program product of claim 6, wherein the first message includes the extracted metrics.

8. The computer program product of claim 5, wherein the display of the service provider profile includes a display of an availability status of the service provider.

9. A method for establishing a communication between service demand and service providers, the method comprising:

receiving a request fora service to be performed;
extracting a set of metrics from the request, the metrics including a location of a service site and a service type;
searching a database of service provider profiles in accordance with the metrics;
displaying a service provider profile that matches the metrics on a client-side tool,
wherein the display of the service provider profile on the client-side tool includes concurrently displaying on a same screen all of (i) a map of the location of the service site and a location of the service provider relative to the location of the service site, (ii) a rating of the service provider, (iii) an estimated distance of the service provider from the location of the service site, and (iv) an input field for selecting the service provider;
upon selection of the service provider profile, communicating a first message to a service-side tool having the selected service provider profile; and
upon acceptance by the service-side tool, communicating a second message to the client-side tool, the second message including a notice of acceptance by the service-side tool corresponding with the selected service provider profile and an estimated time of arrival of a selected service provider,
wherein, when a user has both a client profile and a service provider profile, a home screen of the client-side tool displays the user's client profile and an option to directly toggle from the client-side tool to the service-side tool,
upon selection of the option on the home screen of the client-side tool, the home screen of the client-side tool is automatically replaced with a screen of the service-side tool that displays the user's service provider profile and an option to view a pending job request, and the view of the pending job request is a list of pending service requests, each with a client profile that submitted a respective service request and a time left to accept and complete the respective service request, and
the method further comprises receiving a rating of a service provider from the client-side tool and saving the rating to a corresponding service provider profile.

10. The method of claim 9, wherein the metrics further include appointment time.

11. The method of claim 10, wherein the first message includes the extracted metrics.

12. The method of claim 9, wherein displaying the service provider profile includes displaying an availability status of service provider.

* * * * *